United States Patent [19]

Goto et al.

[11] Patent Number: 4,832,436

[45] Date of Patent: May 23, 1989

[54] OPTICAL FIBER DISTRIBUTION APPARATUS

[75] Inventors: Shigenori Goto, Sakura; Saburo Mase, Tokyo; Hirofumi Tayama, Osaka; Tadashi Hara, Osaka; Yasuo Fujii, Osaka, all of Japan

[73] Assignees: Fujikura Ltd., Tokyo; Kansai Telecommunication Technology, Osaka, both of Japan

[21] Appl. No.: 255,793

[22] Filed: Oct. 11, 1988

[30] Foreign Application Priority Data

Oct. 15, 1987 [JP] Japan .................. 62-262520
Jan. 20, 1988 [JP] Japan .................... 63-5548

[51] Int. Cl.⁴ ..................... G02B 6/36; G02B 7/26
[52] U.S. Cl. ........................................... 350/96.20
[58] Field of Search ................ 350/96.20, 96.21; 174/50, 59, DIG. 9

[56] References Cited

U.S. PATENT DOCUMENTS 4,502,754 3/1985 Kawa .................. 350/96.20

Primary Examiner—William L. Sikes
Assistant Examiner—Robert E. Wise
Attorney, Agent, or Firm—Sprung Horn Kramer & Woods

[57] ABSTRACT

An optical fiber distribution apparatus of the type in which optical feeder cables are connected to optical distribution cables through connectors. The optical fiber distribution apparatus includes a frame having a front portion; a plurality of distribution panels each having a free front edge; pivoting mechanisms for pivotally mounting respective distribution panels to the frame with regular vertical intervals for pivotable movement about a horizontal axis: and locking mechanisms for releasably locking each of the distribution panels selectively at one of both a normal position, where each distribution panel is parallel to the other with the free edge thereof positioned substantially not higher than the rotation axis thereof, and a raised position, where the free front edge of each distribution panel is raised above the rotation axis thereof for accessing to a distribution panel just below.

8 Claims, 9 Drawing Sheets

OPTICAL FIBER DISTRIBUTION APPARATUS

BACKGROUND OF THE INVENTION

The present invention relates to an optical fiber distribution apparatus which may be suitably used for connecting multi-fiber cables and single-fiber cables used in optical communication.

For transmitting video and aural signals, signal transmission channels are generally formed between a central office and terminals such as subscriber's equipment, using optical fiber cables. In a signal transmission channel, multifiber cables or feeder cables, including optical fibers, are used from the central office to interfaces adjacent to the terminals, and single fiber cables or distribution cables are connected to the feeder cables through the interface and extend to the terminals. With such an arrangement, a high dense signal transmission channel is achieved. For ease in cross-connecting and wiring operation of feeder cables and distribution cables, an optical fiber distribution apparatus, typically illustrated in FIG. 1, has been proposed. In this conventional distribution apparatus, feeder cables 2 and distribution cables 3 are connected through connectors 4 which are mounted in parallel on respective supporting plates 5, which are in turn located in a plane. This distribution panel provides ease in handling of connection between feeder cables 2 and distribution cables 3 by placing the connectors 4 in an exposed state. However, this conventional distribution panel has an disadvantage in that the volume thereof becomes large for increasing cable density since the number or size of supporting plates 5 becomes larger according to an increase in the number of feeder and distribution cables. Further, the distribution apparatus is usually installed in a limited narrow space, such as in a manhole or in an office, and hence there is a strong need for reducing the volume of the distribution apparatus. A similar distribution apparatus of the prior art is disclosed in U.S. Pat. No. 4,502,754 to Kawa, issued on Mar. 5, 1985.

SUMMARY OF THE INVENTION

Accordingly, it is an object of the present invention to provide an optical fiber distribution apparatus which achieves fairly high accommodation density of cables for a given space as compared to the prior art distribution apparatus.

With this and other objects in view, the present invention provides an optical fiber distribution apparatus of the type in which optical feeder cables are connected to optical distribution cables through optical connectors. The optical fiber distribution apparatus includes a frame having a front portion; a plurality of distribution panels each having a free front edge; mounting mechanisms for mounting respective distribution panels to the frame with regular vertical intervals to be pivotable about a horizontal axis: and locking mechanisms for releasably locking each of the distribution panels selectively at one of both a normal position, where each distribution panel is parallel to the other with the free edge thereof positioned substantially no higher than the rotation axis thereof, and a raised position, where the free front edge of each distribution panel is raised above the rotation axis thereof for accessing to a distribution panel just below the each distribution panel.

In an preferred form, at the normal position, each distribution panel is located with the free edge thereof positioned below the rotation axis thereof so that the connectors are exposed outside of easy access. Thus, cross-connection and wiring operation of the cables and maintenance of the distribution panels are facilitated.

The distribution apparatus of the present invention preferably includes a plurality of connector supporting means each mounted in an overlapping manner at one end to the upper face of the distribution panel to form a row, for supporting the connectors. Each connector supporting means may be inclined to the upper face of the associated distribution panel to be parallel to each other. The row of the connector supporting means may be arranged to be substantially parallel to the free edge of the associated distribution panel. With such an arrangement, accommodation density of fiber cables is highly increased, and the cross-connection and wiring operation of the cables and maintenance of the distribution panels are facilitated.

In another preferred mode of the present invention, each distribution panel may have an inlet portion and an outlet portion at respective opposite end thereof. Both the inlet and outlet portions are arranged to be close to the rotation axis the panel. Each panel may be provided with inlet means for leading feeder cables to the corresponding panel through the inlet portion and with outlet means for leading distribution cables out of the corresponding panel through the outlet portion. Such a structure of the panels keeps deformation of both the feeder cables and the distribution cables due to pivotal movement of the corresponding panel substantially minimum.

The distribution apparatus according to the present invention is preferably provided with a plurality of feeder cable guiding means, mounted to the frame, for guiding feeder cables to corresponding panels with at least minimum bending radius with which the feeder cables are substantially free of damage due to long term stress.

BRIEF DESCRIPTION OF THE DRAWINGS

In the drawings:

FIG. 7 is a side view of a modified form of the locking mechanism of FIG. 1;

FIG. 8 is a side view in a reduced scale of part of the optical fiber distribution apparatus using the modified locking mechanisms of FIG. 7, one distribution panel being placed at a raised position;

FIG. 9 is a plan view of a modified form of the optical fiber distribution apparatus of FIG. 2;

FIG. 10 is an enlarged view taken along the line X—X FIG. 9; and

FIG. 11 is an enlarged front view of the securing member of cables in FIG. 9.

DETAILED DESCRIPTION OF THE PREFERRED EMBODIMENTS

Figure 1:
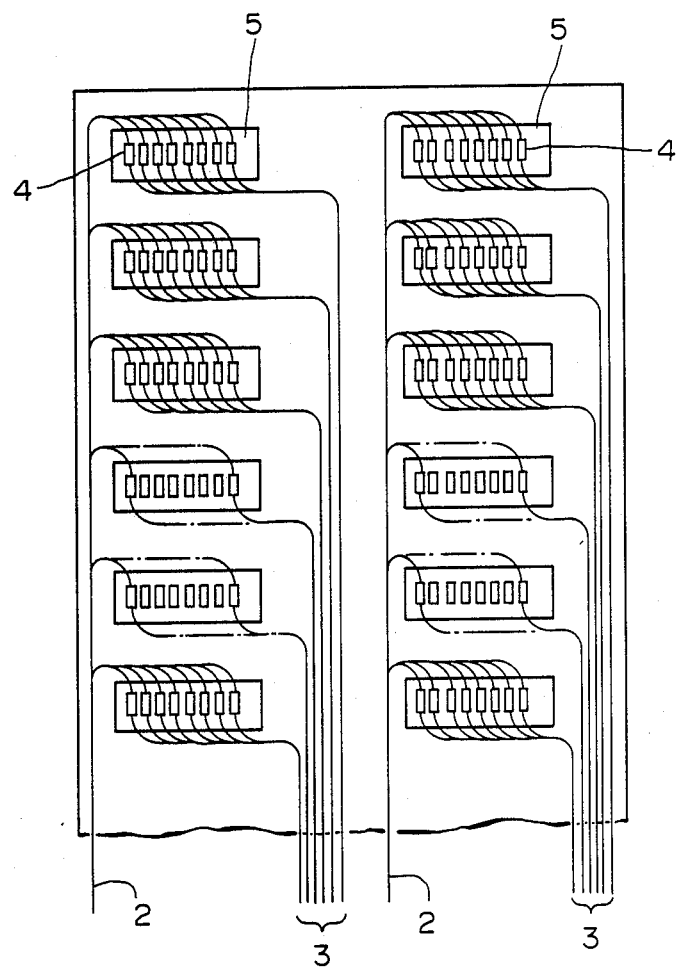
FIG. 1 is a front view of the conventional optical fiber distribution apparatus.

In the drawings, like or similar members are designated by the same reference numerals and description thereof is omitted after once given.

Figure 2:
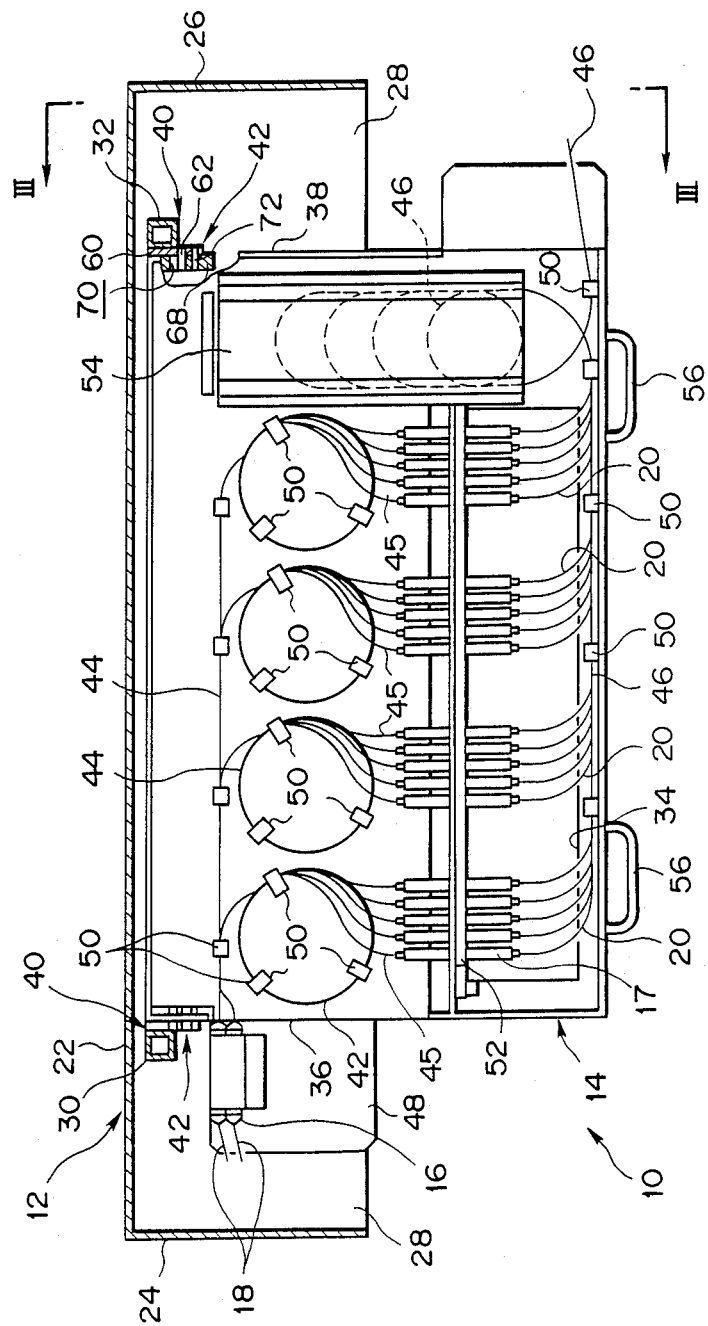
FIG. 2 is a plan view, partly in section, of an optical fiber distribution apparatus according to the present invention.

Referring to FIGS. 1 and 2, the reference number 10 indicates an optical fiber cable distribution apparatus of the present invention. The distribution apparatus 10 includes a hexahedral-box-shaped cabinet 12 and a multiplicity of parallel optical fiber cable distribution panels 14 with connectors 16, 17 for connecting four optical fiber feeder cables 18 to twenty optical fiber distribution cables 20, the distribution panels 14 being pivotally mounted to the cabinet 12. The cabinet 12 has a rear vertical wall 22, a pair of side walls 24, 26, a bottom wall 28 and a top wall which is not shown. The cabinet 12 is provided with a pair of parallel elongated supporting rod members 30 and 32 vertically mounted to the top and bottom walls of thereof. Each distribution panel 14 has generally a rectangular shape and a rectangular opening 34 formed at its front portion below the connectors 17 thereof. The distribution panels 14 are each provided at their opposite ends 36 and 38 with a pair of pivoting mechanism 40 and 40 for pivotally connecting them to the supporting rod members 30 and 32 and are further provided with a pair of locking mechanisms 42 and 42 for releasably locking them at two positions.

Each of the feeder cables 18 which includes 5-fiber ribbon tapes is connected through a multifiber connector 16 to four intermediate cables 44, which are each spliced to fan out five single fiber cords 45 at one end remote from the multifiber connector 16. The five single fiber cords 45 are each connected through a single fiber connector 17 to respective distribution cables 20, of which surplus lengths are bundled to form a single fiber bundle 46.

Each distribution panel 14 has a supporting plate 48 integrally formed with it at its left hand end in FIG. 1 so that the supporting plate 48 projects laterally for mounting the multifiber connectors 16. The distribution panel 14 includes further cable securing members 50, mounted on it for securing intermediate cords 44, surplus lengths of intermediate cords 44 and fiber bundle 46. The reference numeral 52 indicates a vertical supporting plate, integrally formed with the distribution panel 14 to extend laterally, for supporting single fiber connectors 17 in parallel manner. The distribution panel 14 has at its right hand end portion (in FIG. 2) a surplus length cable holding box 54 mounted on it for receiving surplus lengths of single fiber bundle 46. The reference numeral 56 designates a handle for handling the panel 14 for movement.

Each of the pivoting mechanisms 40 for respective distributing panels 14 includes a pair of parallel trapezoidal brackets 60 mounted to respective supporting rod members 30, 32 at the same level to project forwards. The bracket pairs 60, 60 are fixed with regular vertical intervals. Each bracket 60 has a pivot pin 62 mounted to it to project horizontally inwards or to extend towards the pivot pin 62 of the other bracket 60 of the same pair and it is also provided at its front edge with an upper locking recess 64 at the same level as the pivot pin 62 thereof and an lower locking recess 66 below the upper locking recess 64. The distributing panels 14 have each a pair of journal members 68 mounted to rear portions of the bottom face thereof at respective opposite ends 36, 38. Each journal member 68 has a through slot 70, formed to extend along the end edge 36, 38 of the distributing panel 14, for slidably guiding the pivotal pin 62. The journal member 68 further has a locking pin 72 mounted to it so as to project in parallel with the pivotal pin 62 for releasably engaging with the upper and lower locking recesses 64, 66 of the corresponding bracket 60.

Figure 3:
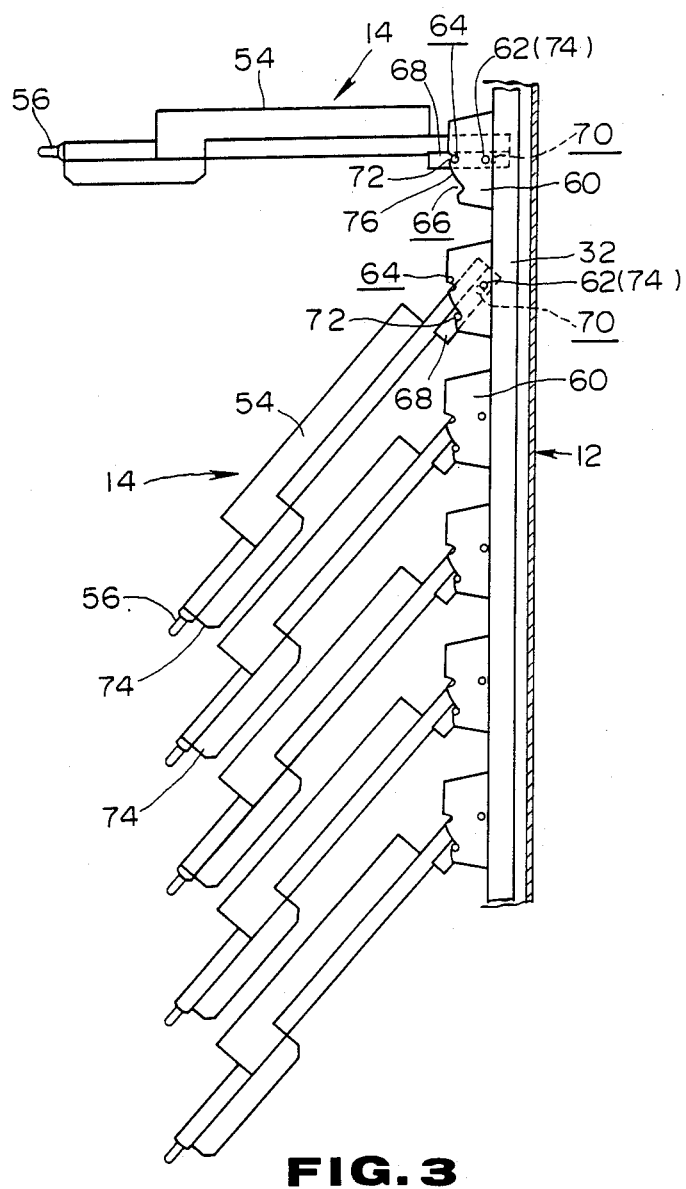
FIG. 3 is a view, taken along the line III—III of FIG. 2.

The distribution panels 14 are normally supported by engaging the locking pins 72 with lower locking recesses 66 of respective brackets 60 so that they are inclined downward in parallel with each other with equal intervals as illustrated in FIG. 2. In this normal position, the free end edge 74 of each distribution panel 14 is located below the rotation axis 76 thereof or pivot pin 62. Thus, the distribution panels 14 are overlapped with each other. When in this position, a distribution panel 14 is turned upwards about the pivotal pins 62 thereof so that it is placed to be horizontal, the locking pins 72 are disengaged from the lower locking recesses 66, guided by the front cam edges 76 of respective brackets 60 and may be then locked to the upper recesses 64 at a raised position. Each distribution panel 14 is manually moved in forward and backward direction for disengaging the locking pins 72 from and engaging them with the upper and lower locking recesses. 64, 66 The radial displacement of the distribution panel 14 with respect to the pivotal pins 62 in such movements is enabled by sliding the latter within the through slots 70 of respective journal members 68. When the locking pins 72 of the distribution panel 14 come into engagement with the upper locking recesses 64 of respective brackets 60, the distribution panel 14 is held in the horizontal raised position as illustrated at the top of FIG. 3. In this horizontal position of the distribution panel 14, another distribution panel 14 just below may undergo various kinds of operation, e.g., connection and disconnection of cables.

The connection of cables of distribution panels 14 are observed through openings 34 of distribution panels 14 just above the lower distribution panels 14.

In place of the locking mechanisms 42, a conventional ratchet mechanism and other well-known mechanisms may be used.

Figure 4:
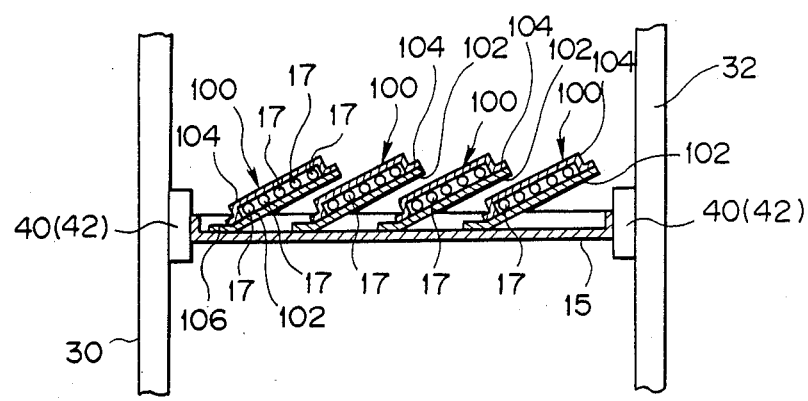
FIG. 4 is a front view partly in vertical section of a modified form of the optical fiber distribution apparatus in FIGS. 2 and 3.
Figure 5:
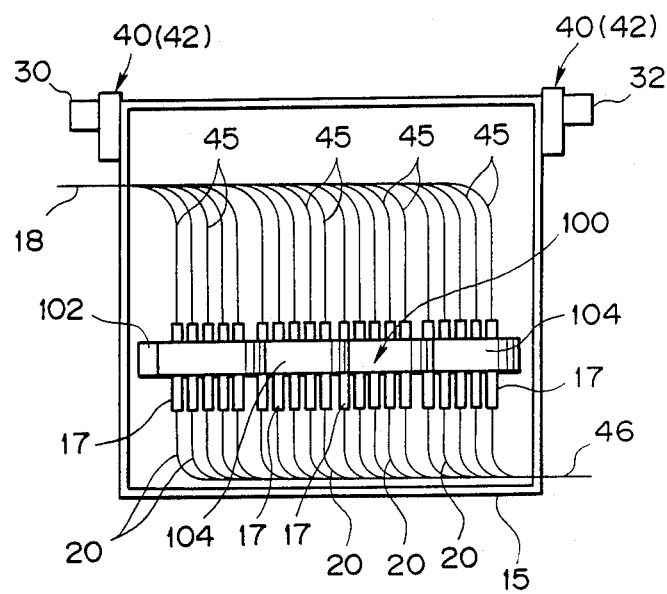
FIG. 5 is a plan view of the optical fiber distribution apparatus of FIG. 4.
Figure 6:
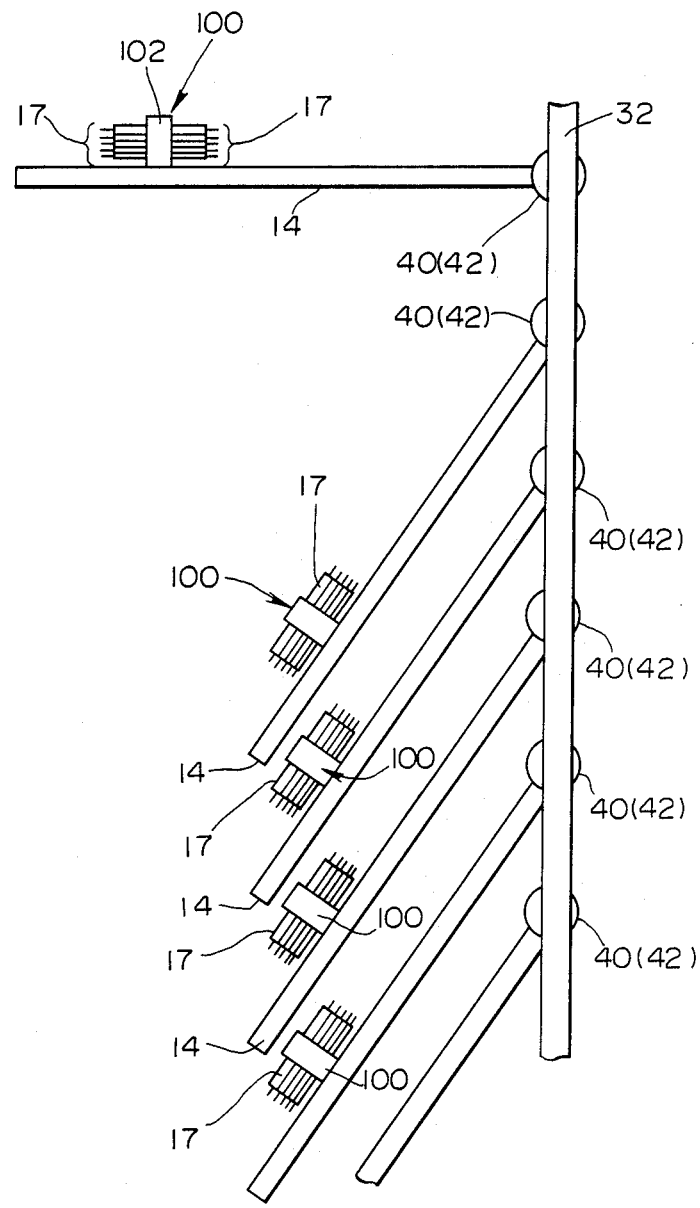
FIG. 6 is an enlarged side view of the apparatus of FIG. 5.

FIGS. 4 and 5 illustrate a modified form of the distribution panel 14 of FIGS. 2 to 3. This modified distribution panel 15 has four connector holding lugs 100, 100, 100, 100 arranged in inclined manner in parallel with each other. The connector holding lugs 100 have each a supporting band 102 and a channel-shaped covering member 104 attached at its flange edges to the supporting band 102 to define a connector holding space between them. Five single fiber connectors 17 are placed through each connector holding lug 100 and secured to it. One end 106 of the supporting band 102 is fixed to the distribution panel 15 and the other portion thereof extends upwards at an acute angle to the distribution panel 15 as clearly shown in FIG. 4. The connector holding lugs 100 are arranged to overlap adjacent connector holding lugs 100 for increasing accommodation density of fiber cables 20. In normal state of the distribution panels 15, they are placed in inclined positions as illustrated at the middle and lower portions of FIG. 6. In this state, connectors 17 can be seen from the front of the distribution panel 15 since the distribution panels 15 are spaced with appropriate vertical intervals.

A modified form of the locking mechanism of FIGS. 2 and 3 is shown in FIGS. 7 and 8, in which no bracket 60 is provided to the supporting rods 30, 32 but locking recesses 64 are formed in the supporting rods 30, 32 for holding the corresponding distribution panels 14 at an inclined raised position in which the panels 14 are inclined upwards with their free edges uppermost. In normal state, the distribution panels 14 are each placed in downwardly inclined position in an arrangement similar to the arrangement of the embodiment of FIG. 3 but the locking pins 72 engages with the front edges of the supporting rod members 30, 32 for holding the panels 14 at the inclined position. When one of the distribution panels 14 with this modified locking mechanism undergoes cross-connecting operation or wiring operation, a distribution panel 14 just above the one panel 14 is turned upwards and locked in the raised position for easy access to the one distribution panel 14. With such raised operation, other three distribution panels 14 which are just above the panel 14 placed at the raised position, are moved upwards by adjacent lower panels 14 to the positions as illustrated by the solid line in FIG. 8 from the positions by the phantom line.

Another modified form of the distribution apparatus 10 of FIGS. 2 and 3 is illustrated in FIGS. 9–11, in which each feeder cable 18 is guided to the corresponding distribution panel 110 by means of a guide mechanism 120. Each guide mechanism 120 includes a substantially semi-cylindrical reel member 122, a first C-shaped guide ring 124 and a second C-shaped guide ring 126. The reel member 122 and the first and second guide rings 124, 126 are mounted on the one side wall 24 The reel member 122 has a substantially semi-cylindrical portion 128 and a pair of substantially semi-circular flanges 130, 130. The semi-cylindrical wall 129 of the semi-cylindrical portion 128 has an outer diameter r equal to or larger than the minimum bending radius, 30 mm in this embodiment, of the optical fibers of the feeder cables for preventing damage due to long term stress from occurring in them. The semi-cylindrical portion 128 has a linear edge bridging opposite ends 144, 146 of the guide wall 129. The first and second guide rings 124, 126 are arranged symmetrically with respect to the reel member 122 and adjacent to opposite ends 144, 146 of the semi-circular wall 129 with their axes 125, 127 positioned vertically. The feeder cables 18 extend upward from the bottom portion of the cabinet 12 and four of them for a distribution panel 110 pass through the first guide ring 124 of the corresponding guide mechanisms 120 and them extend along the semi-cylindrical wall 129, from which they pass through the second ring 126 and exit from the bottom thereof. For placing the feeder cables 18 in such an arrangement, they are brought one by one to pass through open ends 132, 132 and 134, 134 of the first and second rings 124 and 126 for surrounding them. Pivoting mechanisms of each distributing panel 110 have each the bracket 60 directly mounted to the rear wall 22 and has no supporting rod members 30, 32. Securing members 140 for securing cables 18, 44, 46, used in this modification, are made of a resilient synthetic resin and have a substantially C shape as illustrated in FIG. 11. Securing members 140 secure feeder cables 18 and intermediate cables 46 by bringing the cables through open ends 142, 142 thereof to surround them. The feeder cables 18 from the second guide ring 126 are secured to the corresponding distribution panel 110 by a first securing member 140A which is mounted on the rear portion of the panel 110 at a position nearest to the axis of rotation of the panel. The distribution cables 46 go out of the surplus length cable holding member 54 at the rear portion thereof, pass through a ring 146 mounted to the rear wall 22 near the rotation axis of the panel 110 and then through a hook member 148, mounted to the other side wall 16. In the hook member 148, the distribution cables 46 join distribution cables from other distribution panels 110. Thus, in each distribution panel 110, the cables 18, 46 enter and exit it through portions nearest to the rotation axis and hence deformation of the cables 18, 46 due to rotation thereof is kept minimum.

What is claimed is:

1. An optical fiber distribution apparatus of the type in which optical feeder cables are connected to optical distribution cables through connectors comprising:
    a frame having a front portion;
    a plurality of distribution panels each having a free front edge;
    mounting means for mounting each distribution panel to the frame with regular vertical intervals to be pivotable about a horizontal rotation axis: and
    locking means for releasably locking each of the distribution panels selectively at one of both a normal position, where each distribution panel is parallel to the other with the free edge thereof positioned substantially no higher than the rotation axis thereof, and a raised position, where the free front edge of each distribution panel is raised above the rotation axis thereof for accessing to a distribution panel just below the each distribution panel.

2. An apparatus as recited in claim 1, wherein each distribution panel is of a rectangular shape; and wherein at the normal position, each distribution panel is located with the free edge thereof positioned below the rotation axis thereof so that the connectors are exposed outside for easy access.

3. An apparatus as recited in claim 2, wherein each distribution panel has an upper face, further comprising a plurality of connector supporting means each mounted in an overlapping manner at one end to the upper face of the distribution panel to form a row, for supporting the connectors, each connector supporting means being inclined to the upper face of the associated distribution panel to be parallel to each other, the row of the connector supporting means being substantially parallel to the free edge of the associated distribution panel.

4. An apparatus as recited in claim 1, wherein each distribution panel has an upper face, further comprising a plurality of connector supporting means each mounted in an overlapping manner at one end to the upper face of the distribution panel to form a row, for supporting the connectors, each connector supporting means being inclined to the upper face of the associated distribution panel to be parallel to each other, the row of the connector supporting means being substantially parallel to the free edge of the associated distribution panel.

5. A apparatus as recited in claim 4, wherein each distribution panel has an inlet portion and an outlet portion at respective opposite end thereof, both inlet and outlet portions being close to the rotation axis thereof, further comprising inlet means for leading feeder cables to the corresponding panel through the inlet portion and outlet means for leading distribution cables out of the corresponding panel through the outlet portion, whereby deformation of both the feeder cables and the distribution cables due to pivotal movement of the corresponding panel is kept substantially minimum.

6. An apparatus as recited in claim 5, further comprising surplus length distribution cable holding means, mounted on the upper face of the corresponding distribution panel, for holding surplus length of the distribution cables for change of connection.

7. An apparatus as recited in claim 6, further comprising a plurality of feeder cable guiding means, mounted to the frame, for guiding feeder cables to corresponding panels with at least minimum bending radius with which the feeder cables are substantially free of damage due to long term stress.

8. An apparatus as recited in claim 7, wherein the feeder cable guiding means comprises: a substantially semi-cylindrical reel member, having a semi-cylindrical guide wall having an center axis and a linear edge bridging opposite ends of the guide wall, the guide wall being adapted to guide feeder cables for the corresponding distribution panel; a first hooking member for hooking feeder cables passing therethrough; and a second hooking member for hooking the feeder cables for the corresponding panel, the reel member being mounted to the panel with both the center axis and the linear edge placed substantially parallel to the horizontal plane, the linear edge being faced downwards; and wherein the first and second hooking member are arranged symmetrically to the center axis of the reel member, the first hooking member being placed near one end of the cylindrical wall remote from the inlet portion of the corresponding distribution panel and the second hooking member being located near the other end of the cylindrical wall nearer to the inlet portion thereof.

* * * * *